United States Patent [19]

Trumble et al.

[11] Patent Number: 4,918,885

[45] Date of Patent: Apr. 24, 1990

[54] METHOD AND APPARATUS FOR INHIBITING ICE MASS FORMATION

[75] Inventors: William P. Trumble, Kanata; Alan D. Ross, Gloucester; Kevin H. Dick, Nepean, all of Canada

[73] Assignee: Bell Canada, Montreal, Canada

[21] Appl. No.: 114,967

[22] Filed: Oct. 30, 1987

[30] Foreign Application Priority Data

May 15, 1987 [CA] Canada .................................. 537312

[51] Int. Cl.⁵ ............................................. E02D 35/00
[52] U.S. Cl. .................................. 52/125.3; 174/99 R; 405/157
[58] Field of Search .......................... 52/19, 20, 125.3; 174/52 R, 52 PE, 99 R, 99 E; 206/331, 334; 405/157

[56] References Cited

U.S. PATENT DOCUMENTS

| | | | |
|---|---|---|---|
| 282,010 | 7/1883 | Putnam | 174/99 |
| 285,267 | 9/1883 | How | 174/99 R |
| 2,301,672 | 11/1942 | Akam | 52/125.3 |
| 2,602,764 | 7/1952 | Billingham | 405/157 X |
| 2,773,512 | 12/1956 | Burk | 405/157 X |
| 3,582,533 | 6/1971 | Albright | 405/157 X |
| 4,656,313 | 4/1987 | Moore et al. | 174/35 R |

Primary Examiner—David A. Scherbel
Assistant Examiner—Creighton Smith
Attorney, Agent, or Firm—R. J. Austin; C. W. Junkin

[57] ABSTRACT

In a method and apparatus for inhibiting ice mass formation around equipment housed in a chamber subject to water penetration, a plurality of compressible, non-absorbent, smooth-surfaced blocks are packed around the equipment to substantially fill the chamber. The blocks are provided with handles for their placement in and removal from the chamber. The blocks are particularly useful for inhibiting ice mass formation in shallow underground chambers housing telecommunications cable equipment.

19 Claims, 2 Drawing Sheets

METHOD AND APPARATUS FOR INHIBITING ICE MASS FORMATION

The invention relates to a method and apparatus for inhibiting the formation of an ice mass around equipment housed in a chamber subject to water penetration.

Telephone cable equipment, such as splice enclosures and line repeaters, are typically housed in underground chambers, such as manholes, to permit relatively easy access for maintenance and repair purposes. These underground chambers are subject to ground water penetration. Under the severe winter conditions experienced in Canada and parts of the northern United States, ground water which penetrates into the chamber may freeze, forming an ice mass around the equipment housed in the chamber. Such an ice mass exerts outwardly directed forces on the walls of the chamber, and inwardly directed forces on the equipment housed in the chamber. These forces may damage either the walls or the equipment, or both. Moreover, to obtain access to equipment encased in such an ice mass, it is necessary to melt the ice mass and to pump the resulting water from the chamber. This time consuming procedure delays the repair and return to service of damaged equipment, and requires the use of expensive heating and pumping apparatus.

The above problems are particularly severe in shallow manholes or "handholes", a substantial portion of which may be located above the frost line. As these structures are significantly cheaper to build than the deeper manhole structures more commonly used in Canada and the northern United States, methods and apparatus for inhibiting the formation of ice masses in such structures have been sought.

It is known, for example, that filling a shallow manhole or handhole chamber with soil, gravel or plastic foam pellets packed around the equipment housed in the chamber can reduce the quantity of water admitted to the chamber and alleviate some of the crushing action resulting from formation of ice in the chamber. However, these materials do not prevent the formation of a monolithic mass of ice and aggregate within the chamber. This monolithic mass prevents access to the equipment housed in the chamber until sufficient heat is applied to melt the ice component of the mass. Even when no ice is present (or indeed, after the ice has been melted), removal of the soil, gravel or foam pellets is difficult and time consuming.

The present invention seeks to obviate or mitigate the above problems by providing a method and apparatus for inhibiting the formation of an ice mass around equipment housed in a chamber subject to water penetration.

According to one aspect of the invention, there is provided a method of inhibiting the formation of an ice mass around equipment housed in a chamber subject to water penetration, comprising packing a plurality of compressible, non-absorbent, smooth-surfaced blocks around the equipment to substantially fill the chamber, each block having an upwardly facing handle.

According to another aspect of the invention, there is provided an assembly comprising: a plurality of walls defining a chamber having an upwardly facing opening; cable equipment arranged within the chamber; a plurality of compressible, non-absorbent smooth-surfaced blocks packed around the cable equipment to substantially fill the chamber, each block having an upwardly facing handle; and a lid fitting over the opening to close the chamber.

The blocks, when packed around the equipment housed in the chamber to substantially fill the chamber, limit the quantity of water which may penetrate into the chamber. Moreover, should the limited quantity of water which penetrates into the chamber freeze, the compressible blocks absorb the compressive forces due to ice formation, preventing mechanical damage to the walls of the chamber and the equipment housed in the chamber. The blocks are easily removed from the chamber to expose the equipment for maintenance and repair, even in the presence of ice between the blocks since the smooth surfaces on the blocks inhibit adhesion of the blocks to the ice. The blocks include a handle to facilitate their placement in and removal from the chamber.

Preferably, the blocks comprise foam blocks having a smooth, integral, water impermeable skin.

Thus, according to another aspect of the invention, there is provided a block of compressible closed-cell foam having a smooth, integral, water impermeable skin and a pair of oppositely facing surfaces, one of said surfaces including a recess, the block carrying a handle in the recess and a rigid plate on the other of said surfaces, the handle being rigidly connected to the plate by rigid means extending through the foam block.

The rigid plate spreads forces applied to the handle across the foam to prevent tearing of the handle from the foam.

Preferably, the foam blocks are provided with an anti-adhesive coating to further inhibit adhesion of the foam to ice forming in the chamber. The blocks may have side surfaces which slope inward from the handle-bearing surface to the plate-bearing surface to further inhibit formation of ice bonds between adjacent blocks.

An embodiment of the invention will now be described, by way of example only, with reference to the accompanying drawings, in which.

Each of a plurality of bodies for packing around equipment housed in a chamber subject to water penetration to inhibit formation of an ice mass around the equipment, comprises a block 10 formed of compressible closed-cell polyurethane foam having a density of approximately fourteen pounds per cubic foot. The block 10 is formed within a mold using closed-cell foam molding techniques which are well known in the foam manufacturing industry. In particular, the mold is cooled so as to provide a smooth integral skin 12 on the block. The skin 12 inhibits absorption of water into the foam and adhesion of ice to the foam.

Silicone is sprayed onto internal surfaces of the mold between molding operations to inhibit adherence of the molded block 10 to the mold. The silicone also acts as a surfactant to further suppress foaming at the internal surfaces of the cooled mold as desired for the formation of the smooth skin 12. Moreover, some of the silicone is deposited on and in the skin 12 to provide an anti-adhesive coating to the block 10.

Figure 1:
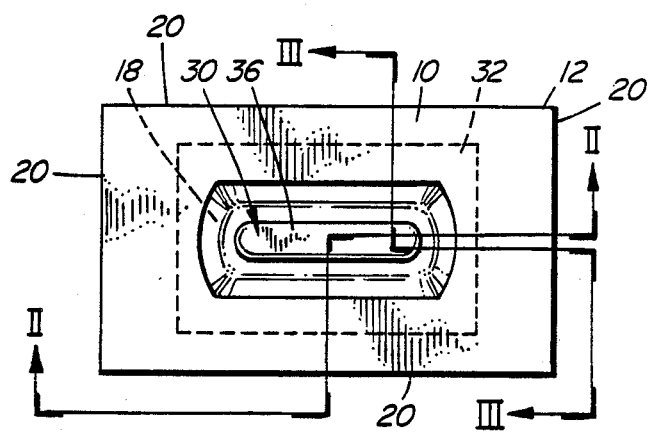
FIG. 1 is a plan view of a foam block constructed according to the embodiment.
Figure 2:
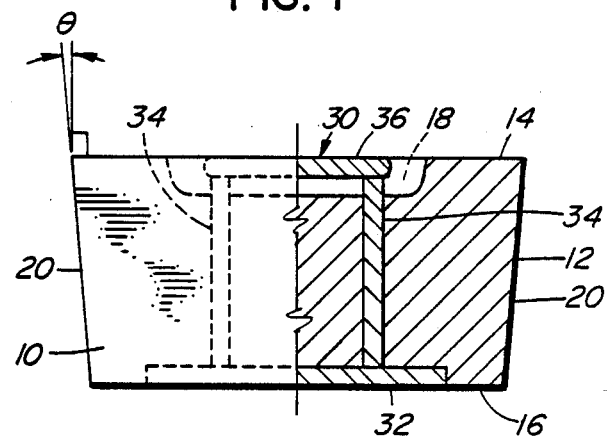
FIG. 2 is a side elevational view of the foam block of FIG 1, partly in cross-section taken along section line II—II in FIG. 1.
Figure 3:
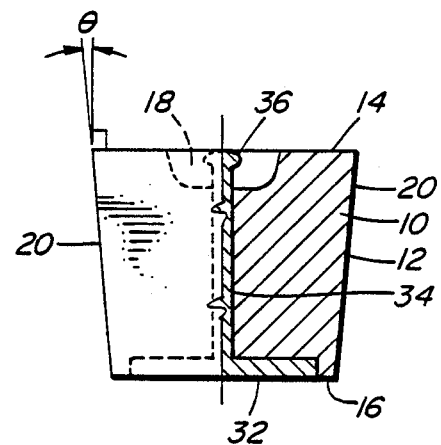
FIG. 3 is an end elevational view of the foam block of FIG. 1, partly in cross-section taken along section line III—III in FIG. 1.

The foam block 10 has a pair of oppositely facing surfaces, shown as an upper surface 14 and a lower surface 16 in FIGS. 1 to 3. The upper surface 14 includes a recess 18. The foam block 10 also has side surfaces 20 which slope inward from the upper surface 14 to the lower surface 16 of the block at an angle $\phi$ to a direction which is normal to the upper and lower surfaces. The angle $\phi$ is approximately 2.5° in the embodiment shown in FIGS. 1 to 3.

The block 10 carries a handle assembly 30 which is partially embedded within the foam of the block during the molding process. The assembly 30 includes a rigid metal plate 32 which is embedded in the block 10 at its lower surface so as to contact the lower surface over approximately one half of its area. A pair of rigid metal rod members 34 extend upward from the plate 32, one at each end of the plate, through the foam of the block 10 and into the recess 18 of the upper surface 14. A handle in the form of a rigid metal bar 36 extends between upper ends of the members 34 within the recess 18. The bar 36 is spaced from surface portions of the block 10 defining the recess 18 to permit manual gripping of the bar. The plate 32 spreads vertical force applied to the bar 36 over a considerable portion of the lower surface 16 of the block 10 to prevent tearing of the handle assembly 30 from the block.

Figure 4:
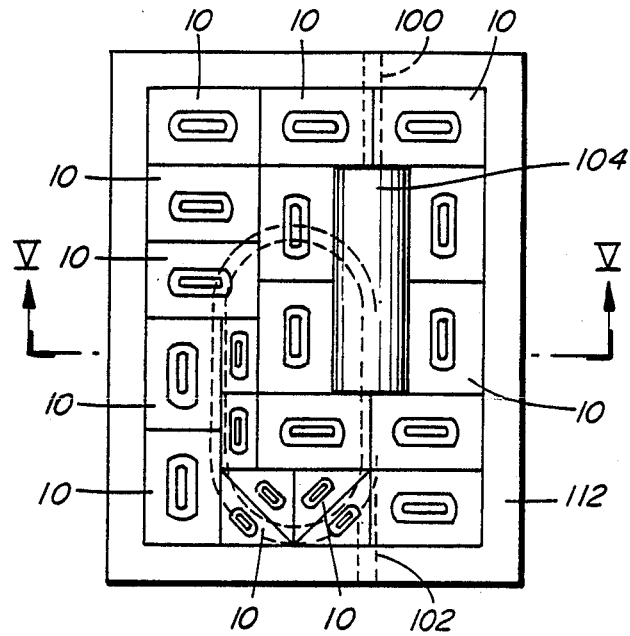
FIG. 4 is a plan view of a handhole chamber packed with foam blocks of the type shown in FIG. 1, drawn to a different scale than FIG. 1.
Figure 5:
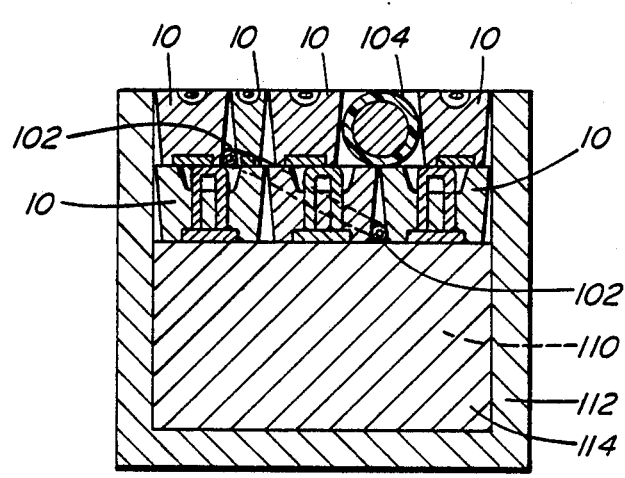
FIG. 5 is a cross-sectional view of the handhole chamber of FIG. 4 taken along section line V—V in FIG. 4.

The foam block 10, and other foam blocks 10 of similar construction, are packed around telephone cable equipment, such as cables 100, 102 and cable splice enclosure 104, in a chamber, such as handhole chamber 110 defined by walls 112, as shown in FIGS. 4 and 5. The blocks 10 are arranged in layers around the equipment 100, 102, 104 to substantially fill the chamber 110 with their handles facing upwards.

Note that blocks 10 of several different standard sizes and shapes, as shown in FIG. 4, may be required to accommodate the several types of equipment which may be housed in such chambers. Note further that the chamber 110 may be partially filled with gravel 114 or other suitable filler below the level of the equipment 100, 102, 104 to reduce the number of layers of blocks 10 required to substantially fill the chamber 110.

The handhole chamber 110 is fitted with a cover (not shown) when access to the equipment 100, 102, 104 is not required.

The integral skin 12 of the foam blocks 10 prevents absorption of ground water into the foam. Consequently, water penetrating into the chamber 110 will first be absorbed by the gravel filler 114. Once the gravel filler 114 is saturated, any additional water will occupy spaces around the foam blocks 10. Once these spaces are filled, no further water may penetrate into the chamber 110. Note that the foam blocks will be prevented from floating by the weight of the handhole cover (not shown).

Should the water in the chamber 110 freeze, a monolithic mass of ice and gravel filler may form below the level of the equipment 100, 102, 104. This ice mass is of little consequence as it will not deter access to the equipment 100, 102, 104.

Ice may also form in the spaces around the foam blocks 10. The compressive forces due to such ice formation will be absorbed by the compressible foam blocks 10, preventing damage to the equipment 100, 102, 104 and the chamber walls 112.

Should access to the equipment 100, 102, 104 be required, it is a simple matter to remove the foam blocks 10 to expose the equipment since the smooth skin 12 of the foam and the anti-adhesive coating of the blocks inhibit adhesion of the blocks to ice between the blocks. Moreover, the inward taper of the foam blocks 10 further inhibits formation of an ice bond between adjacent blocks. Any ice which has formed between the blocks is easily broken and removed from the handhole chamber 110 in conveniently sized chunks.

In alternative embodiments constructed according to the invention, the foam blocks 10 may have an anti-adhesive coating selected from a group consisting of silicones, polymerized fluorocarbons, perfluorocarbons, fatty acids and metal sulfides. The blocks 10 may be formed of closed-cell polyurethane foam having a density anywhere between eight pounds per cubic foot and twenty pounds per cubic foot. The plate 22 may contact the surface 16 of each block 10 over any area which is at least one third of the area of the surface 16 of the block 10. The side surfaces 24 of each block 10 may slope inward at an angle $\phi$ of from 1° to 5°.

What is claimed is:

1. A method of inhibiting the formation of an ice mass around equipment housed in a chamber subject to water penetration, comprising packing a plurality of compressible, non-absorbent, smooth-surfaced blocks around the equipment to substantially fill the chamber, each block having an upwardly facing handle.

2. An assembly comprising:
   a plurality of walls defining a chamber having an upwardly facing opening;
   cable equipment arranged within the chamber;
   a plurality of compressible, non-absorbent smoothsurfaced blocks packed around the cable equipment to substantially fill the chamber, each block having an upwardly facing handle.

3. An assembly comprising:
   a plurality of walls defining a chamber having an upwardly facing opening;
   cable equipment arranged within the chamber;
   a plurality of compressible, non-absorbent smoothsurfaced blocks packed around the cable equipment to substantially fill the chamber, each block having an upwardly facing handle; and
   a lid fitting over the opening to close the chamber; wherein the blocks are formed of closed-cell foam having a smooth integral skin for inhibiting absorption of water into the foam and adhesion of the foam to ice forming in the chamber.

4. As assembly as defined in claim 3, wherein the blocks are formed of closed-cell polyurethane foam having a density between eight pounds per cubic foot and twenty pounds per cubic foot.

5. An assembly as defined in claim 4, wherein the blocks have an anti-adhesive coating for further inhibiting adhesion of the foam to ice forming in the chamber.

6. An assembly as defined in claim 5, wherein the anti-adhesive coating comprises a material selected from a group consisting of silicones, polymerized fluorocarbons, perfluorocarbons, fatty acids and metal sulfides.

7. An assembly as defined in claim 3, wherein each block has an upper surface including a recess and a lower surface, and carries a handle in the recess and a rigid plate on the lower surface, the handle being rigidly connected to the plate by rigid means extending through the block.

8. An assembly as defined in claim 7, wherein the plate contacts the lower surface over at least one third of the area of said lower surface.

9. An assembly as defined in claim 8, wherein the plate contacts said lower surface over approximately one half of the area of said lower surface.

10. An assembly as defined in claim 7, wherein each block has side surfaces which slope inward from said upper surface to said lower surface at an angle to the vertical of between 1° and 5°.

11. An assembly as defined in claim 10, wherein the angle is approximately 2.5°.

12. An assembly, comprising:
a plurality of compressible, non-absorbent smoothsurfaced blocks packed around the cable equipment to substantially fill the chamber, each block having an upwardly facing handle;
a lid fitting over the opening to close the chamber; and
a layer of filler material below the level of the cable equipment.

13. A block of compressible closed-cell foam having a smooth, integral, water impermeable skin and a pair of oppositely facing surfaces, one of said surfaces including a recess, the block carrying a handle in the recess and a rigid plate on the other of said surfaces, the handle being rigidly connected to the plate by rigid means extending through the block.

14. A foam block as defined in claim 13, wherein the plate contacts said other of said surfaces over at least one third of the area of said other of said surfaces.

15. A foam block as defined in claim 14, wherein the plate contacts said other of said surfaces over approximately one half of the area of said other of said surfaces.

16. A foam block as defined in claim 13, having surfaces which slope inward from said one of said oppositely facing surfaces to said other of said oppositely facing surfaces at an angle to a direction normal to said oppositely facing surfaces of between 1° and 5°.

17. A foam block as defined in claim 16, wherein the angle is approximately 2.5°.

18. A foam block as defined aS defined in claim 13, having an anti-adhesive coating selected from a group consisting of silicones, polymerized fluorocarbons, perfluorocarbons, fatty acids and metal sulfides.

19. A foam block as defined in claim 13, formed of closed-cell polyurethane foam having a density between eight pounds per cubic foot and twenty pounds per cubic foot.

* * * * *